United States Patent [19]

Brockwell

[11] 4,326,626
[45] Apr. 27, 1982

[54] SLAT CONVEYORS
[75] Inventor: Ian P. Brockwell, Wyckoff, N.J.
[73] Assignee: Alfa Laval Pty Ltd., Victoria, Australia
[21] Appl. No.: 131,929
[22] Filed: Mar. 21, 1980
[30] Foreign Application Priority Data
  Mar. 23, 1979 [GB] United Kingdom ............... 10317/79
[51] Int. Cl.³ ............................................. B65G 39/20
[52] U.S. Cl. .................................. 198/845; 198/849; 198/850
[58] Field of Search ................ 198/838, 845, 849–853
[56] References Cited
  U.S. PATENT DOCUMENTS
  1,794,182  2/1931  Kunz ................................. 198/853
  2,987,167  6/1961  Franz ................................ 198/853
  3,082,861  3/1963  Kornylak ........................... 198/838
  3,259,228  7/1966  Wilding ............................. 198/838

FOREIGN PATENT DOCUMENTS
  663106  12/1951  United Kingdom ............... 198/850

Primary Examiner—Joseph E. Valenza
Attorney, Agent, or Firm—Curtis, Morris & Safford

[57] ABSTRACT

A conveyor comprises two endless chains mounted on sprockets secured on two transverse shafts, and a plurality of transverse slats mounted on and extending between the chains. The chains are fitted with wheels which roll along rails for supporting the chains and slats. Each slat comprises a main plate made of thin sheet metal and having its longitudinal margins turned down through an angle greater than 90°, a rod having the shape of a shallow V which extends along the underside of the plate and has its ends secured to the main plate adjacent the ends of the main plate, and a central upright plate which supports the center of the main plate on the center of the rod.

6 Claims, 4 Drawing Figures

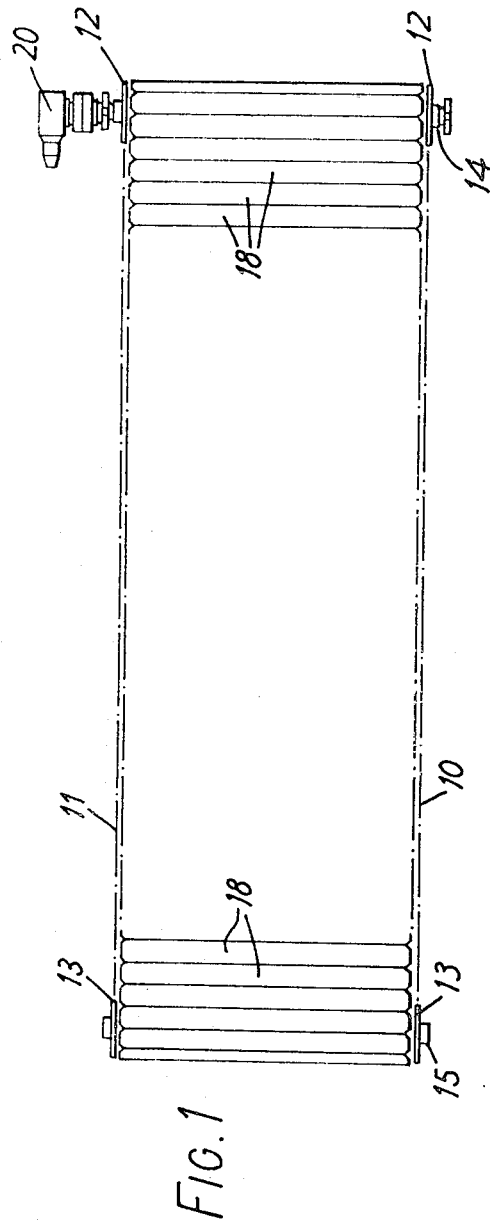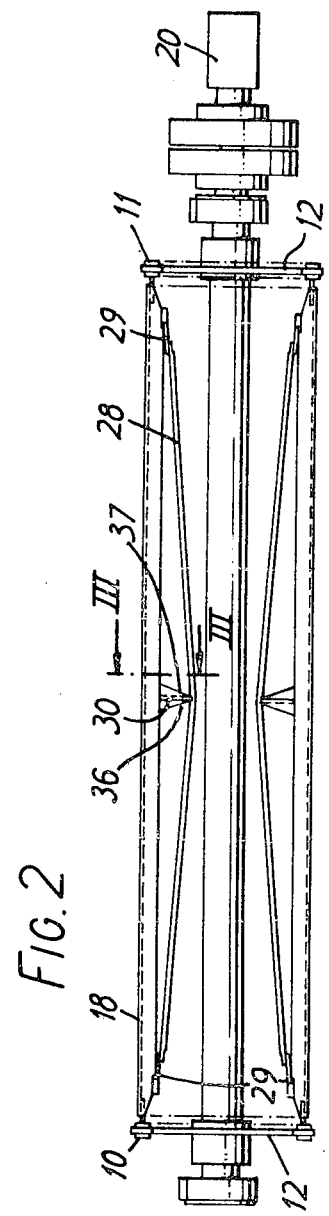

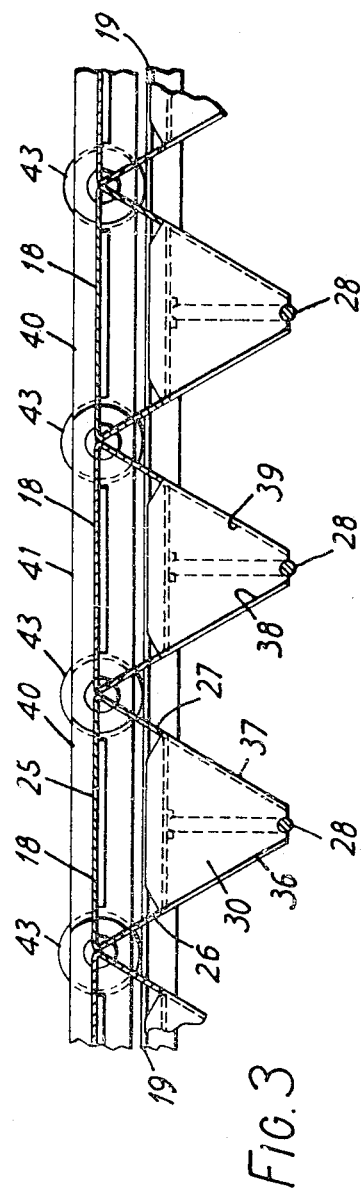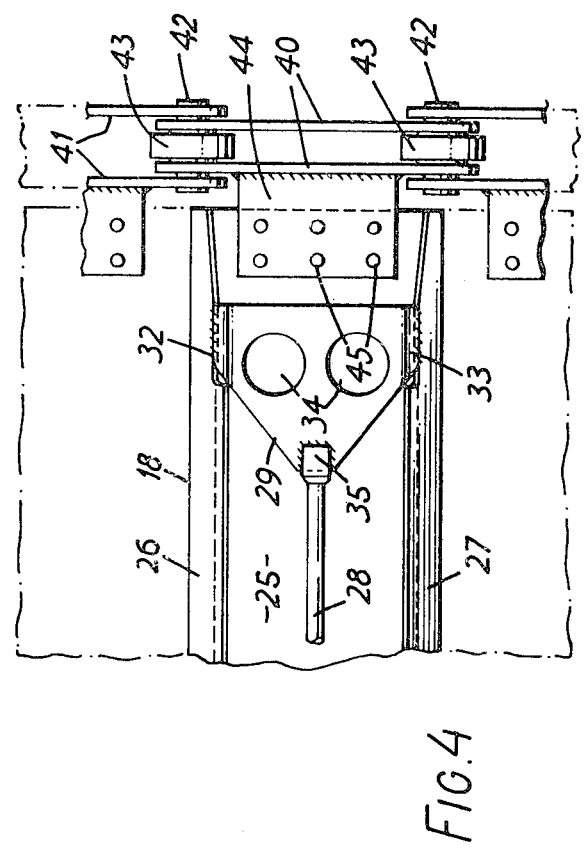

SLAT CONVEYORS

This invention relates to slat conveyors and is concerned more particularly but not exclusively to endless slat conveyors which are suitable for use in large cheese making installations.

In large scale production of cheese in mechanised installations, it is necessary to move continuously large volumes of cheese curd. In many systems this is achieved by use of endless belt conveyors. It is, however, often necessary to move quite wide and relatively deep mats of cheese curd which apply a very heavy load per unit area to the belt. Several known installations use continuous metal belts which have sufficient strength to support the cheese curd but which are flexible both in the transverse and longitudinal directions. These types of belts therefore require quite large numbers of support rollers along their complete lengths. However, it has still been found that the belts tend to flex and sag between the rollers. Furthermore the limited flexible nature of these types of belts have required large diameter end or drive rollers which has meant that the height of these structures are difficult to reduce and these large rollers are subject to mechanical failure.

It has been proposed to use slat conveyors in cheese making installations. It is however necessary that the conveyor itself should present a flat upper surface on which the curd rests. It is also necessary that no substantial gaps or recesses appear on this surface where harmful bacteria could develop. This can best be achieved by use of quite thin sheet material for the slats. In the proposed slat conveyor mentioned above, it is however necessary to provide a longitudinal stationary support to prevent lateral flexing or collapse of the slats, resulting in a relatively complex and expensive conveyor.

The object of the present invention is to provide an improved construction of slat for use in a slat conveyor in which the supporting surface of the slat can be made of thin sheet metal but which can nevertheless support a relatively heavy load per unit area without stationary supports between the ends of the slat.

According to the present invention there is provided a slat for use in a slat conveyor, said slat comprising an elongated main plate, and longitudinal stiffening means including a rod having the shape of a shallow V extending along the main plate on the underside thereof with the sections of the rod between the centre and the ends thereof inclined relative to the main plate, the ends of the rod being secured to the main plate, and a support member supporting the centre portion of the main plate on the centre portion of the rod. The longitudinal margins of the plate are preferably bent downwardly such that an angle of less than 90° is created between the longitudinal margins and the lower face of the main plate.

The main plate of the slat of the invention may be made of thin sheet material, conveniently stainless steel, yet nevertheless support a comparatively heavy load per unit area without bending to any appreciable extent due to the stiffening action of the rod and the support member. The use of thin material for the main plate of the slat has the advantage that the longitudinal margins can be turned down through a small radius so that contiguous slats is a conveyor which abut or are closely spaced to one another present a substantially flat surface.

According to the invention there is also provided an endless conveyor comprising a plurality of slats as defined in the last but one paragraph connected at their ends respectively to a pair of endless chains, and guide means arranged to guide said chains for movement about endless tracks. Preferably, the guide means comprise rails, and each of said chains is fitted with rollers which roll along the rails and support the chain and slats thereon.

One construction of an endless slat conveyor according to the invention will now be described, by way of example, with reference to the accompanying drawings, in which:

FIG. 1 is a plan view of the conveyor,

FIG. 2 is a transverse cross-sectional view of the conveyor,

FIG. 3 is a longitudinal cross-sectional view of part of the conveyor, taken along the line III—III in FIG. 2, but on a larger scale, and FIG. 4 is a view of the underside of one end of a slat of the conveyor and the adjacent chain.

Referring to the drawings, the conveyor comprises two endless chains 10, 11 each mounted on two sprockets 12, 13 secured on transverse shafts rotatably mounted in bearings on a frame (not shown), and a plurality of transverse slats 18 mounted on and extending between the chains 10, 11. The upper and lower runs of the chains are supported on guide rails 19 (FIG. 3) secured on the frame of the conveyor, and an electric motor 20 is arranged to drive the sprockets 12 and thereby pull the chains along the rails 19.

Each slat 18 comprises a thin substantially rectangular elongated main plates 25, the longitudinal margins 26, 27 of which are tuned inwards as shown in FIGS. 3 and 4 such that an angle of less than 90° is created between the longitudinal margins and the lower face of the main plate. The minimum angle through which the longitudinal margins are turned will depend on the diameter of the sprockets 12, 13 and will be that necessary to avoid interference between adjacent slats during movement around the ends of the conveyor. In the conveyor shown in the drawings the margins 26, 27 are turned through 120°. Each slat also comprises a rod 28 which extends along the underside of the main plate 25, the rod 28 having the shape of a shallow V as viewed in FIG. 2, two end plates 29 each welded to a separate end of the rod and to the side margins 26, 27, and a central support plate 30.

Each end plate 29 has its side margins 32, 33 turned upwards such that they lie at the same angle to one another as the angle between the longitudinal margins 26, 27 of the main plate, and is arranged with the upper edges of the side margins 32, 33 abutting against the lower edges of the longitudinal margins 26, 27 of the main plate 25 and welded thereto as shown in FIG. 4. The plates 29 are provided with apertures 34 to facilitate cleaning.

Each end of the rod 28 is formed with a flattened portion 35 which engages flat against the associated end plate 29 and is welded thereto.

The support plate 30 is formed from a flat plate having substantially the shape of an inverted truncated triangle, the side margins 36. 37 of which are turned in opposite directions through 90° along fold lines 38, 39 which lie at approximately the same angle to one another as the angle between the longitudinal margins 26, 27 of the main plate 25, the plate 30 being arranged with the upper edges of the side margins 36, 37 abutting against the lower edges of the longitudinal margins 26, 27 of the main plate 25 and welded thereto. The lower edge of the support plate 30 is formed with a semi-circular groove which engages around the upper surface of the centre portion of the rod 28.

Each chain comprises pairs of parallel inner links 40 connected to pairs of parallel outer links 41 by pivot pins 42, and rollers 43 rotatably mounted on the centre portions of the pins 42 between the inner links 40. The pivot pins 42 are spaced apart a distance equal to the width of each slat. The rollers 43 have a diameter greater than the depth of the links so that the rollers project above and below the links. A horizontal flange 44 is welded to each of the links on the side of the chain adjacent the slats for support of the slats.

The main plate 25 of each slat is mounted at its ends on the flanges 44 on the chains and is secured thereto by bolts or rivets 45. The chains are in turn supported by their rollers 43 on the guide rails 19 which extend along the upper and lower runs of the conveyor (only the rail 19 on the upper run is shown in the drawings). The rollers 43 are free to roll along the rails 19 when the motor 20 drives the sprockets 12 of the conveyor.

The slats 18 are positioned close together as shown in FIGS. 1 and 3 to provide a substantially smooth surface for support of a product, such as cheese curd. The slats can conveniently be made of stainless steel.

Each slat 18 can support a relatively heavy loading per unit area without any appreciable bending of the thin sheet metal plate 25, due to the fact that the centre portion of the plate 25 is supported by plate 30 on the centre of the V-shaped bar 28 which is in turn rigidly secured at its ends to the ends of the main plate 25. The centre portion of the main plate 25 may be provided with apertures for drainage purposes without appreciably reducing the load carrying capacity of the slat.

I claim:

1. A conveyor comprising guide rail means at each side of the conveyor, a pair of endless chains arranged one at each side of the conveyor and supported on said guide rail means for movement therealong, and a plurality of transverse slats mounted at their ends respectively on said chains, said slats being contiguous and cooperating with one another to provide a supporting surface for a product to be transported by the conveyor, wherein each slat comprises an elongated main plate having the longitudinal margins thereof bent downwardly through an angle in excess of 90°, the centre portion of the main plate between said longitudinal margins being substantially flat and adapted to provide said supporting surface, rod means extending along the main plate on the underside thereof, said rod means being in the shape of a shallow V, rod anchor means firmly securing the ends of the rod means to the longitudinal margins of the main plate at the associated ends thereof, and a central support firmly secured to the longitudinal margins of the main plate at the centre thereof and abutting the rod means at the centre thereof, said V-shaped rod means being arranged with each half section between the centre and an end thereof inclined relative to said centre portion of the main plate, and said central support being arranged to transmit to the centre of said rod means any deflection of the centre portion of the main plate due to load on said supporting surface when the conveyor is in use, whereby said deflection is resisted by longitudinal tension in said rod means.

2. A conveyor as claimed in claim 1, wherein said rod anchor means for each end of the rod means comprises an end plate welded to said rod means, the end plate having opposing margins welded to the longitudinal margins of the main plate.

3. A conveyor as claimed in claim 2, wherein said opposing margins of the end plate are bent upwards to lie at approximately the same angle to one another as the angle between the longitudinal margins of the main plate, said opposing margins of the end plate being in abutting contact with the longitudinal margins of the main plate and welded thereto.

4. A conveyor as claimed in claim 1, wherein said central support comprises a plate having approximately the shape of an inverted truncated triangle with the edges thereof lying at approximately the same angle to one another as the angle between the longitudinal margins of the main plate and welded thereto.

5. A conveyor as claimed in claim 1, wherein said central support comprises a plate having approximately the shape of an inverted truncated triangle with its side margins bent in opposite directions through 90° along fold lines which lie at approximately the same angle to one another as the angle between the longitudinal margins of the main plate, the support plate being arranged with the upper ends of its side margins in contact with the longitudinal margins of the main plate and welded thereto.

6. A conveyor comprising guide rail means at each side of the conveyor, a pair of endless chains arranged one at each side of the conveyor and supported on said guide rail means for movement therealong, each of said chains comprising a plurality of links pivotally connected to one another, transverse spindles mounted on said links, and rollers rotatably mounted on said spindles and adapted to roll along said guide rail means, the links on the chains which are on the inboard side of the conveyor having slat support brackets, and a plurality of slats mounted at their ends respectively on said slat support brackets on the chains, said slats being contiguous and co-operating with one another to provide a supporting surface for a product to be transported by the conveyor, wherein each slat comprises an elongated main plate having the longitudinal margins thereof bent downwardly through an angle in excess of 90°, the centre portion of the main plate between said longitudinal margins being substantially flat and adapted to provide said supporting surface, a rod extending along the main plate on the underside thereof, said rod being in the shape of a shallow V, two end plates welded one to each of the opposite ends of said rod, each end plate having opposing margins welded to the longitudinal margins of the main plate, and a central support plate having opposing margins welded to the longitudinal margins of the main plate at the centre thereof, said central support plate engaging the V-shaped rod at the apex thereof, said V-shaped rod being arranged with each half section between the centre and an end thereof inclined relative to said centre portion of the main plate, and said central support plate being arranged to transmit to the centre of said rod any deflection of the centre portion of the main plate due to load on said supporting surface when the conveyor is in use, whereby said deflection is resisted by longitudinal tension in said rod.

* * * * *